United States Patent Office 2,970,136
Patented Jan. 31, 1961

2,970,136
METHOD OF PREPARING γ-GLUTAMYL PEPTIDES AND INTERMEDIATES

Gaston Amiard, Noisy-le-Sec, Rene Heymes, Romainville, and Leon Velluz, Paris, France, assignors to UCLAF, Paris, France, a corporation of France No Drawing. Filed Dec. 18, 1956, Ser. No. 628,976

Claims priority, application France Dec. 30, 1955

9 Claims. (Cl. 260—112)

This invention relates to a new process for preparing γ-glutamyl peptides by directly reacting an amino acid or peptide ester with free N-trityl glutamic acid in the presence of a disubstituted carbodiimide.

We found that blocking the glutamic acid by tritylation at the nitrogen permits a selective condensation between the γ-carboxyl group of glutamic acid and the amino group of α-amino acids if this peptide condensation is carried out in the presence of a di-substituted carbodiimide.

It is, therefore, the principal object of the present invention to provide γ-glutamyl peptides of the general formula

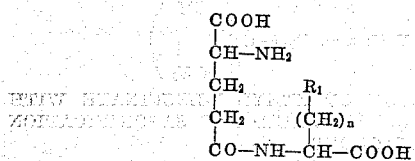

wherein $n$ represents a denominator ranging from 0 to 8 and $R_1$ represents hydrogen and alkyl, aralkyl, aryl and heterocyclic groups that may comprise hydroxyl or sulfur.

It is an other object of the invention to provide a method of preparing such γ-glutamyl peptides.

It is still another object of the invention to provide, as new commercial products, intermediates obtained in the preparation of these γ-glutamyl peptides.

These and other objects and advantages of the present invention will become more obvious from the herein-following detailed description and from the appended claims.

As to the substantial advantages of the herein-claimed new method of producing γ-glutamyl peptides in comparison to prior methods, attention is called to our paper in the Bull. Soc. Chim., 1956, p. 97, while the following short discussion is believed to suffice in connection with this application.

In our copending application Serial No. 596,151 of July 6, 1956, now Patent No. 2,933,487, a method has been decribed of preparing α- and γ-glutamyl peptides from glutamic acid,

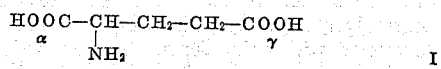

According to this copending application, α-glutamyl peptides are prepared by reacting an N-tritylated glutamic α- or γ-monoester with the ester of an amino acid or peptide in the presence of dicyclohexylcarbodiimide, followed by alkaline saponification and detritylation by means of aqueous acetic acid. γ-Glutamyl peptides are produced by reacting α-benzyl N-trityl glutamate with the benzyl ester of an amino acid or peptide in the presence of dicyclohexylcarbodiimide and subjecting the resulting N-tritylated derivative of the γ-glutamyl peptide benzyl diester to a selective hydrogenolysis followed by detritylation. Advantage is thereby taken of the discovery that the α-ester group of glutamic acid benzyl diesters is very stable against alkalies and alcoholysis agents, which permits to readily obtain γ-alkylated α-benzylated diesters and therefrom the α-benzylated monoester by monosaponification or the γ-alkylated monoester by hydrogenolysis.

When carrying out the afore-described process, it was noted that only the α-benzyl glutamic ester permits the preparation of pure γ-glutamyl peptides since it does not require an alkaline treatment while liberating α-carboxyl after the formation of the γ-peptide. Indeed, it was observed that the alkaline treatment of a diester of N-trityl γ-glutamyl peptide II, leads to the formation of primarily α-glutamyl peptide IV, most probably over the cyclic derivative III, as illustrated by the following structural formulae:

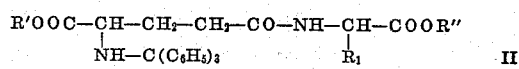

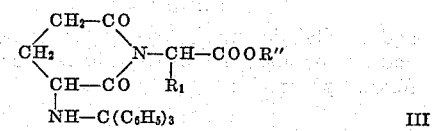

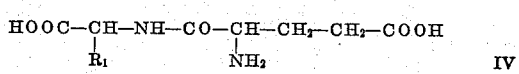

wherein $R_1$ represents an alkyl, aryl or a heterohyclic group, R' represents an alkyl and R" represents an alkyl that may or may not be identical with R'.

In our copending application Serial No. 628,975, filed December 18, 1956, entitled Method of Making Glutathione and Intermediates, now Patent No. 2,900,375, a new method of producing L-γ-glutamyl L-cysteinyl glycine has been described wherein the last step in the tripeptide synthesis consists in condensing the ethly S-trityl L-cysteinyl glycinate with N-trityl glutamic acid in order to obtain the ester of the desired S,N-ditrityl γ-glutamyl tripeptide. There, the blocking action of the nitrogen-bound trityl group of the glutamic acid permits the selective condensation of the γ-carboxyl with the amino group of the ethyl S-trityl L-cysteinyl glycinate.

Now we have found that the selectivity of the afore-described condensation at the γ-position occurs also with α-amino acids, whereby, however, the molecular hindrance is much less than in the case of ethyl S-trityl L-cysteinyl glycinate. This surprising discovery permits us, as set forth in the herein-claimed invention, to broaden the use of N-trityl glutamic acid and to obtain γ-glutamyl peptides without the intermediary formation of the N-tritylated α-benzyl glutamic ester obtained as the result of monosaponification of α-benzyl γ-methyl N-trityl glutamate prepared according to our copending application Serial No. 594,117, filed June 27, 1956, now Patent No. 2,883,399.

N-trityl L-glutamic acid is readily obtained by hydrogenolysis of dibenzyl N-trityl L-glutamate prepared according to the afore-mentioned application filed June 27, 1956. Although the present invention does not claim the preparation of N-trityl L-glutamic acid, in order to make this application complete it will be shortly described at the end of the specification.

Broadly, the method of this invention consists in dissolving, in a suitable solvent, N-trityl L-glutamic acid

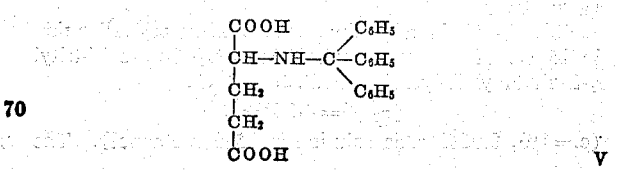

a disubstituted carbodiimide and an amino ester of the general formula $$\underset{\text{VI}}{H_2N-CH-COOR} \atop (CH_2)_n-R_1$$

wherein $n$ represents a numeral ranging from 0 to 8, $R_1$ represents hydrogen and alkyl, aralkyl, aryl or heterocyclic groups including hydroxylated and sulphurated derivatives of such groups, and R represents a lower alkyl such as methyl or ethyl, permitting the reaction mixture to remain undisturbed at a temperature ranging from 0° C. to the refluxing temperature of the solvent used, eliminating excessive carbodiimide by means of an acid treatment, saponifying by means of an alkaline treatment, isolating N-trityl peptide $$\begin{array}{c} COOH \quad\quad C_6H_5 \\ CH-NH-C-C_6H_5 \\ CH_2 \quad\quad C_6H_5 \\ CH_2 \quad\quad (CH_2)_n-R_1 \\ CO-NH-CH-COOH \end{array} \quad VII$$

and detritylating the latter by means of heating in an aqueous or alcoholic acid to obtain a compound of the following formula:

$$\begin{array}{c} COOH \\ CH-NH_2 \\ CH_2 \\ CH_2 \quad\quad (CH_2)_n-R_1 \\ CO-NH-CH-COOH \end{array} \quad VIII$$

The method is preferably carried out in the following manner:

N-trityl L-glutamic acid in the form of the triethylamine acid salt is dissolved in methylene chloride, and the ester of the amino acid which is to be condensed therewith, as well as an equimolecular amount of dicyclohexylcarbodiimide are added. The solution is left standing at room temperature for some time, and the dicyclohexylurea that forms upon treatment with acetic acid is separated. After the usual washings the solution is evaporated to dryness and the residue is saponified by means of an alcoholic soda solution. N-trityl γ-glutamyl peptide, VII, is isolated and then detritylated by heating in aqueous or alcoholic acetic acid.

EXAMPLE 1

*Preparation of γ-L-glutamyl L-tyrosine (VIII; n=1, $R_1$=—$C_6H_4$—OH)*

(a) CONDENSATION OF ETHYL L-TYROSINATE WITH N-TRITYL L-GLUTAMIC ACID AND SAPONIFICATION OF THE ESTER GROUP 3.85 g. of ethyl L-tyrosinate and 3.8 g. of dicyclohexylcarbodiimide are dissolved in 50 cc. of methylene chloride, and 8.8 g. of triethylamine salt of N-trityl L-glutamic acid are added. The solution is left standing overnight at room temperature. After cooling to 0° C., dicyclohexylurea, is separated and washed with 10 cc. of methylene chloride. The filtrate and the methylene chloride washing are combined and washed with 45 cc. of N/2 hydrochloric acid and water, dried over magnesium sulfate and vacuum evaporated to dryness at a temperature of less than 20° C. The residue obtained thereby is dissolved in 20 cc. of ethanol, 55 cc. of normal soda are added, the solution is heated for ten minutes to 60° C. After adding 70 cc. of ice water and 60 cc. of normal hydrochloric acid, the product obtained in this manner is separated, washed with water and dried under vacuum.

This results in a product which, after crystallization in 25 cc. of absolute alcohol, consists of pure N-trityl γ-glutamyl L-tyrosine, M.P.=145° C., $$[\alpha]_D^{20}=+34°\pm2$$

(c.=1%, 0.06% soda solution in 75% methanol). The new product is obtained in form of small, colorless prisms, insoluble in water, ether, acetone, benzene, chloroform, difficultly soluble in cold alcohol. It contains two molecules of crystallization ethanol which it loses successively when heated to 80° and 110° C.

Analysis of the product dried at 80° C.: $C_{33}H_{32}O_6N_2$ $C_2H_5OH=598.67$. Calculated: 70.2% C; 6.4% H; 18.7% O; 4.7% N. Found: 70.2% C; 6.3% H; 19.1% O; 4.9% N.

(b) DETRITYLATION OF N-TRITYL γ-L-GLUTAMYL L-TYROSINE 3.5 g. of N-trityl γ-L-glutamyl L-tyrosine are introduced into 20 cc. of 50% aqueous acetic acid, and the solution is heated in the water bath for ten minutes. Triphenylcarbinol is separated and washed with water and the wash water is combined with the filtrate and vacuum evaporated to dryness at a temperature not exceeding 30° C. The residue is dissolved in 6 cc. of water, 200 cc. of acetone are gradually added, and the solution is left standing overnight at room temperature. Filtration and washing with acetone and ether produces 1.7 g. (97%) of γ-L-glutamyl L-tyrosine, M.P.=265–270° C., $[\alpha]_D^{20}=+26°\pm2$ (c.=2%, water). The product is identical with a sample of γ-L-glutamyl L-tyrosine prepared according to G. Amiard, R. Heymes and L. Velluz, Bull. Soc. Chim., 1956, p. 97.

EXAMPLE 2

*Preparation of γ-L-glutamyl L-leucine*

$$\left(VIII; n=1, R_2=-CH\underset{CH_3}{\overset{CH_3}{\diagup}}\right)$$

(a) CONDENSATION OF ETHYL L-LEUCINATE WITH N-TRITYL L-GLUTAMIC ACID AND SAPONIFICATION OF THE ESTER GROUP 1.95 g. of ethyl leucinate hydrochloride are dissolved in 3 cc. of chloroform and the solution is cooled to 0° C. Diethylamine is added drop by drop until the pH is 9, and 30 cc. of cold sulfuric ether are introduced into the mixture. The resulting diethylamine hydrochloride is separated and the filtrate is vacuum evaporated to dryness without heating. The residue representing the free amino ester is taken up with 10 cc. of methylene chloride. After adding 4.9 g. of the triethylamine salt of N-trityl L-glutamic acid dissolved in 10 cc. of methylene chloride, 2.06 g. of dicyclohexylcarbodiimide dissolved in 5 cc. of methylene chloride, the mixture is first left standing for one hour at room temperature, and is then treated with 0.5 cc. of acetic acid, and the dicyclohexylurea that has formed is separated by filtration. The filtrate is washed with water, diluted hydrochloric acid, and again with water, and is then dried over magnesium sulfate and vacuum evaporated to dryness without heating. For the purpose of saponification, the resulting residue is dissolved in 5 cc. of ethanol and 15.4 cc. of normal soda are added. After heating the mixture for 10 minutes to 70° C., 50 cc. of iced water are added, then, 15.4 cc. of normal hydrochloric acid, and the N-trityl peptide is extracted with chloroform. The chloroform solution is washed with water, dried over magnesium sulfate and vacuum evaporated to dryness. The residue, crystallized in 2.5 cc. of absolute alcohol, yields pure, hitherto unknown, N-trityl γ-L-glutamyl L-leucine, M.P.=141–144° C., $[\alpha]_D^{20}=-35°\pm2$ (c.=2%, chloroform).

*Analysis.*—$C_{30}H_{34}O_5N_2=502.59$. Calculated: 71.69% C; 6.83% H; 5.57% N. Found: 71.4% C; 7.0% H; 5.8% N.

(b) DETRITYLATION OF N-TRITYL γ-L-GLUTAMYL L-LEUCINE 2.8 g. of N-trityl γ-L-glutamyl L-leucine are introduced into 10 cc. of 50% aqueous acetic acid. The solution is heated on a boiling water bath for seven minutes and separated triphenylcarbinol is removed and washed with water. The wash water is combined with the filtrate and concentrated under vacuum at a temperature not exceeding 40° C. until the volume is approximately 2 cc. 100 cc. of acetone are added, the solution is separated, washed with acetone and ether and then dried under vacuum. 1.19 g. (83%) of γ-L-glutamyl L-leucine are obtained; M.P.=221–222° C., $[\alpha]_D^{20} = -17° \pm 2$ (c.=2%, water). The product is identical with a sample of γ-L-glutamyl L-leucine prepared according to G. Amiard, R. Heymes and L. Velluz, Bull. Soc. Chim., 1956, p. 97.

EXAMPLE 3

Preparation of γ-L-glutamyl L-methionine
(VIII; n=1, $R_1 = -CH_2-S-CH_3$)

(a) CONDENSATION OF THE METHYL ESTER OF L-METHIONINE WITH N-TRITYL L-GLUTAMIC ACID AND SAPONIFICATION OF THE ESTER GROUP 0.9 g. of the hydrochloride salt of the methyl ester of L-methionine are dissolved in 3 cc. of chloroform. The solution is cooled to 0° C., diethylamine is added drop by drop until the pH is 9, and 30 cc. of cold sulfuric ether are introduced. The precipitated diethylamine hydrochloride is separated and the filtrate is vacuum evaporated to dryness without heating. The residue is taken up with 3 cc. of methylene chloride. After adding 2.2 g. of the triethylamine salt of N-trityl glutamic acid dissolved in 5 cc. of methylene chloride and 0.98 g. of dicyclohexylcarbodiimide dissolved in 4 cc. of methylene chloride, the solution is left standing at room temperature for three hours, whereupon it is treated with 0.3 cc. of acetic acid and filtered. The filtrate is washed with water, diluted hydrochloric acid and again with water, and is then dried over magnesium sulfate and vacuum evaporated to dryness without heating. In order to carry out saponification, the residue obtained in this manner is dissolved in 3 cc. of absolute alcohol, 6.9 cc. of normal soda are added, and the mixture is heated for 10 minutes to 65° C. After adding 30 cc. of ice water and 6.9 cc. of normal hydrochloric acid, the mixture is extracted with chloroform. The chloroform solution is washed with water, dried over magnesium sulfate and vacuum evaporated to dryness. This produces a residue which, after crystallization in 5 cc. of absolute alcohol, yields pure, hitherto unknown, N-trityl γ-L-glutamyl L-methionine, M.P.=about 140° C.

(b) DETRITYLATION OF N-TRITYL γ-L-GLUTAMYL L-METHIONINE 520 mg. of N-trityl γ-L-glutamyl L-methionine are suspended in 2.5 cc. of 50% aqueous acetic acid, and the suspension is heated for seven minutes in a boiling water bath. After cooling and adding 2 cc. of water, triphenylcarbinol is separated by filtration. The filtrate is evaporated to dryness under vacuum at a temperature not exceeding 40° C. 40 cc. of acetone are added to the residue, which is separated, washed with acetone and ether and then dried under vacuum.

This produces 175 mg. (65%) of γ-L-glutamyl L-methionine, M.P.=228–231° C., $[\alpha]_D^{20} = -9° \pm 1$ (c.=1.4%, water). This product, which has not been hitherto described, appears in the form of colorless needles, soluble in water, insoluble in alcohol, ether, acetone, benzene, chloroform.

Analysis.—$C_{10}H_{18}O_5N_2S = 278.32$. Calculated: 43.2% C; 6.5% H; 10.1% N. Found: 43.2% C; 6.5% H; 9.8% N.

EXAMPLE 4

Preparation of γ L-glutamyl glycine (VIII; n=0, $R_1$=H)

(a) CONDENSATION OF N-TRITYL L-GLUTAMIC ACID WITH ETHYL GLYCINATE AND SAPONIFICATION OF THE ESTER 1.4 g. of the hydrochloride of ethyl glycinate are suspended in 25 cc. of methylene chloride and the suspension is cooled to 0° C. Gradually, while stirring, 1 cc. of diethylamine is added, then 4.9 g. of the triethylamine salt of N-trityl L-glutamic acid and 2.1 g. of dicyclohexylcarbodiimide. The mixture is left standing overnight at room temperature and, after adding 0.5 cc. of acetic acid, dicyclohexylurea is separated and washed with 10 cc. of methylene chloride. The filtrate and the wash solution are combined, first washed with N/2 hydrochloric acid and ice water, and are then dried over sodium sulfate and vacuum evaporated to dryness. The residue is taken up with 25 cc. of ethyl acetate, 1 cc. of diethylamine is added, and the solution is left standing for ten hours in the sold. Separation of the solids yields 3.65 g. (67%) of the diethylamine salt of ethyl N-trityl γ-L-glutamyl glycinate. 2.45 g. of this salt are dissolved in 20 cc. of water, 6 cc. of normal hydrochloric acid are added, and the solution is extracted with 50 cc. of ether. The solution is first washed with ice water, then dried over magnesium sulfate and vacuum evaporated to dryness. The resulting product (ethyl γ-N-trityl L-glutamyl glycinate) is dissolved in 10 cc. of alcohol. 10 cc. of normal soda are added to the solution which is left standing for one and one-half hours at room temperature. After cooling to 0° C., 11 cc. of normal hydrochloric acid are added and the solution is extracted with 25 cc. of chloroform. The chloroform solution is washed three times with ice water and then vacuum concentrated to 5 cc. The solids are separtaed, washed with chloroform and dried, producing N-trityl γ-L-glutamyl glycine; M.P.= about 145° C. The new product is obtained in the form of colorless needles, insoluble in water, difficultly soluble in chloroform and ether, soluble in alcohol and acetone.

(b) DETRITYLATION OF N-TRITYL γ-L-GLUTAMYL GLYCINE

Detritylation can be carried out by means of aqueous acetic acid according to the process described at 1(b), 2(b), and 3(b), but may be also accomplished in the following manner:

1 g. of N-trityl γ-L-glutamyl glycine is dissolved in 9 cc. of 95% alcohol, 0.9 cc. of acetic acid are added, and the solution is heated for one hour to 65° C. After cooling to room temperature, separating, washing with alcohol and acetone and drying at 90° C., 0.3 g. (66%) of γ-L-glutamyl glycine are obtained, identical with a sample prepared according to the process of G. Amiard, R. Heymes and L. Velluz, Bull. Soc. Chim., 1956, p. 97.

Preparation of glutamic N-trityl acid (a) PREPARATION OF DIBENZYL N-TRITYL L-GLUTAMATE 18.2 g. of dibenzyl L(+)glutamate hydrochloride prepared according to H. Sachs and E. Brand (J. Am. Chem. Soc., 1953, 75, 4610) are dissolved in 100 cc. of chloroform. The solution is cooled to 0° C., and 15 cc. of triethylamine are added. While maintaining a temperature of 0° C., 14 g. of trityl chloride are added, and the solution is left standing at room temperature for forty-eight hours. The solution, wherein the triethylamine hydrochloride has partly crystallized, is washed with water, then with HCl acidified water and again with water until the wash water is neutral. The chloroform solution is dried over magnesium sulfate and evaporated to dryness in a water bath at 40° C. The residue is taken up with 75 cc. of hot absolute alcohol, about 15 cc. of which are distilled off in order to completely eliminate the chloroform. After the start of crystallization, initiated by scraping the walls with a stirrer, the flask is cooled and the crystalline solids separated and washed with methanol, producing 23.1 g. of dibenzyl N-trityl L-glutamate that can be used directly for hydrogenolysis (yield: 81%).

(b) HYDROGENOLYSIS OF DIBENZYL N-TRITYL L-GLUTAMATE 57 g. of dibenzyl N-trityl L-gutamate are dissolved in 500 cc. of ethyl acetate, palladium on charcoal prepared from 15 g. of vegetable black and 5 cc. of a 20% aqueous palladous chloride solution is introduced, and 27 cc. of triethylamine are added. The mixture is hydrogenated until the theoretical amount of hydrogen is absorbed, which requires about forty-five minutes. The catalyst is then separated and washed with ethyl acetate, the wash water combined with the filtrate is concentrated to about 100 cc. After cooling, 100 cc. of ether are added to the solution which is separated from solids, washed with ether and dried at 80° C., yielding 40 g. (81%) of the triethylamine acid salt of N-trityl L-glutamic acid used in the process of the present invention. However, this N-trityl L-glutamic acid may be also prepared by directly tritylating L-glutamic acid or by saponifying an N-trityl L-glutamic ester.

It is, of course, possible to change the afore exemplified methods in certain respects. Thus, changes may be made in the solvents, the temperature or duration of the reaction without exceeding the scope of the herein-claimed invention.

The melting points stated in the examples are instantaneous melting points obtained by means of the heated block method.

We claim:

1. In a process of producing γ-L-glutamyl peptides of the formula

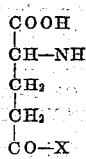

wherein X is the radical of an α-amino carboxylic acid linked to the —CO— group of glutamic acid by its α-amino nitrogen atom, said α-amino carboxylic acid being an acid occurring in natural peptides and proteins, the steps which comprise preparing a solution of N-trityl-L-glutamic acid in methylene chloride, adding to said solution dicyclohexyl carbodiimide as condensing agent and a lower alkyl ester of said α-amino carboxylic acid, allowing the mixture to stand at a temperature ranging from 0° C. to the boiling point of the solvent until condensation is completed, treating the reaction mixture at room temperature with dilute acetic acid to destroy unreacted dicyclohexyl carbodiimide, filtering off precipitated dicyclohexyl urea formed thereby, evaporating the filtrate to dryness, dissolving the residue in ethanol, adding N sodium carbonate solution to the resulting solution, heating the mixture to a temperature ranging from room temperature to 65° C. until saponification of the ester group is completed, recovering the resulting N-trityl peptide, heating said N-trityl peptide with about 50% aqueous acetic acid until the trityl group is split off, filtering off the precipitated triphenyl carbinol, and recovering the resulting γ-L-glutamyl peptide from the hydrolysis mixture.

2. In a process of producing the γ-glutamyl peptides selected from the group consisting of γ-L-glutamyl-L-tyrosine, γ-L-glutamyl-L-leucine, γ-L-glutamyl-L-methionine, and γ-L-glutamyl glycine, the steps which comprise preparing a solution of N-trityl-L-glutamic acid in methylene chloride, adding to said solution dicyclohexyl carbodiimide as condensing agent and a lower alkyl ester of an α-amino carboxylic acid selected from the group consisting of L-tyrosine, L-leucine, L-methionine, and glycine, allowing the mixture to stand at a temperature ranging from 0° C. to the boiling point of the solvent, until condensation is completed, treating the reaction mixture of room temperature with dilute acetic acid to destroy unreacted dicyclohexyl carbodiimide, filtering off precipitated dicyclohexyl urea formed thereby, evaporating the filtrate to dryness, dissolving the residue in ethanol, adding N sodium carbonate solution to the resulting solution, heating the mixture to a temperature ranging from room temperature to 65° C. until saponification of the ester group is completed, recovering the resulting N-trityl peptide, heating said N-trityl peptide with about 50% aqueous acetic acid until the trityl group is split off, filtering off the precipitated triphenyl carbinol, and recovering the resulting γ-L-glutamyl peptide from the hydrolysis mixture.

3. The N-trityl-γ-L-glutamyl peptide of the formula

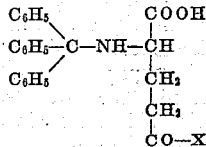

wherein X is the radical of an α-amino carboxylic acid linked to the —CO— group of glutamic acid by its α-amino nitrogen atom, said α-amino carboxylic acid being an acid occurring in natural peptides and proteins.

4. The N-trityl-γ-L-glutamyl peptide selected from the group consisting of N-trityl-γ-L-glutamyl-L-tyrosine, N-trityl-γ-L-glutamyl-L-leucine, N-trityl-γ-L-glutamyl-L-methionine, and N-trityl-γ-L-glutamyl glycine.

5. N-trityl γ-L-glutamyl L-methionine.
6. N-trityl γ-L-glutamyl L-leucine.
7. N-trityl γ-L-glutamyl L-tyrosine.
8. N-trityl γ-L-glutamyl glycine.
9. γ-L-glutamyl L-methionine.

References Cited in the file of this patent

Benary et al.: Berichte, vol. 57 (1924) pp. 1324–27.
Helferich et al.: Berichte Deut. Chem. Gesel., vol. 58 pp. 873–875, 882–6 (1925).
Anson et al.: Advances in Protein Chemistry, vol. 5 (1949), pp. 25–32, 43–44 and 72.
Amiard et al.: Bull. Soc. Chim. (France), No. 2 (1955) pp. 191–3.
Sheehan et al.: J.A.C.S., vol. 70 (1955), pp. 1067–8.
Noller: Chemistry of Org. Compounds, 2nd ed., 1958, pp. 305–6.